United States Patent [19]

McManus

[11] Patent Number: 5,237,652
[45] Date of Patent: Aug. 17, 1993

[54] PROGRAMMING SYSTEM FOR PROGRAMMABLE LOGIC CONTROLLER

[76] Inventor: Kirby L. McManus, 15216 NE. 110th Pl., Redmond, Wash. 98052

[21] Appl. No.: 620,640

[22] Filed: Nov. 30, 1990

[51] Int. Cl.$^5$ .......................... G05B 9/02; G06F 3/00
[52] U.S. Cl. ..................................... 395/155; 364/147
[58] Field of Search ................. 364/DIG. 1, DIG. 2, 364/147; 395/500, 162, 140, 155

[56] References Cited

U.S. PATENT DOCUMENTS

| | | | |
|---|---|---|---|
| 4,038,562 | 7/1977 | Kintner | 307/203 |
| 4,326,207 | 4/1982 | Suda et al. | 364/900 |
| 4,608,628 | 8/1986 | Saito et al. | 364/141 |
| 4,703,414 | 10/1987 | Inoue et al. | 364/147 |
| 4,792,918 | 12/1988 | Hirase et al. | 364/900 |
| 4,845,627 | 7/1989 | Nadolski et al. | 364/468 |
| 4,991,076 | 2/1991 | Zifferer et al. | 364/147 |
| 5,062,052 | 10/1991 | Sparer et al. | 364/473 |

FOREIGN PATENT DOCUMENTS

| | | | |
|---|---|---|---|
| 971252 | 7/1975 | Canada | 342/21 |
| 985396 | 3/1976 | Canada | 340/162 |
| 3808135 | 9/1989 | Fed. Rep. of Germany | 1/00 |
| 89/06010 | 6/1989 | PCT Int'l Appl. | 9/06 |
| 89/09961 | 10/1989 | PCT Int'l Appl. | 7/00 |
| 89/09976 | 10/1989 | PCT Int'l Appl. | 15/60 |
| 2099667 | 3/1981 | United Kingdom | 3/153 |
| 2112974 | 11/1981 | United Kingdom | 11/32 |

OTHER PUBLICATIONS

"SLC 150 Programmable Controler," Product data Bulletin No. 1745, Allen-Bradley Company, Industrial Control Group, vol. 2.5, Jan. 1987, 19 pages.
"User's Manual" for 6200 Series Software, PLC-2 Programming Software, Allen-Bradley, Co. Inc., 1988.
Bryan, E. A. and Bryan, L. A., "Programmable Controllers: Theory and Implementation," promotion brochure for the text, Industrial Text Co.
"Programmable Controller," Bulletin No. 943, Eagle Signal Controls Co., Jan. 1987, 12 pages.
"The GE Series One Programmable Controller," General Electric Co. product brochure, Apr. 1986, 4 pages.
"The GE Series Three Programmable Controller," General Electric Co. product brochure, Apr. 1986, 4 pages.
"Modicon 984 Family Control Products," System product description, Modicon, Inc., Jan. 1990, 11 pages, plus Fact Sheet, 5 pages.

Primary Examiner—Robert L. Richardson
Attorney, Agent, or Firm—Christensen, O'Connor, Johnson & Kindness

[57] ABSTRACT

A system for creating a program for a programmable logic controller (PLC). The user inputs a ladder logic command in an alphanumeric format, and the system creates a corresponding ladder logic graph on a display means. The user may then verify the relationship depicted in the graph, before forwarding the ladder logic command to the PLC.

12 Claims, 6 Drawing Sheets

PROGRAMMING SYSTEM FOR PROGRAMMABLE LOGIC CONTROLLER

FIELD OF THE INVENTION

The present invention relates to programmable logic controllers, also known as programmable controllers, and in particular to techniques for creating programs for such controllers.

BACKGROUND OF THE INVENTION

Programmable logic controllers (PLCs) are specialized data processors that are in widespread use in a variety of fields, for example as controllers for machine tools, material handling and assembling systems, for molding and casting machines, and for robotics systems. FIG. 1 presents a simplified diagram of a PLC 12 that includes a plurality of input terminals 14, a plurality of output terminals 16, microprocessor 20, and memory 22. Input terminals 14 and output terminals 16 are collectively referred to as IO points.

PLC 12 operates under the control of a program stored in memory 22. When incorporated into an application, each input terminal 14 will be connected to a switch, a relay contact, or some other device capable of providing an electrical signal indicating one of two states, such as open vs. closed in the case of a switch or relay contact, or high vs. low in the case of a voltage signal. Each output terminal 16 is connected to a device such as a status indicator, a relay coil, etc., that is to be controlled by the PLC.

The PLC operates by repetitively executing what is termed a scan. During each scan, the PLC reads the signals present at input terminals 14, to determine what will here be referred to as input data. Next, the PLC combines the input data with the program stored in memory 22 to determine the corresponding output data. Finally, the PLC uses the output data to set the values of the signals at output terminals 16, and then proceeds to start the next scan.

The program stored in memory 22 and used by the PLC to control its operation is typically expressed in what is termed "ladder logic" format. Each ladder logic program comprises one or more ladder logic statements. In the PLC art, these ladder logic statements are often termed "rungs". Each ladder logic statement defines the relationship between an output variable and, in most cases, one or more input variables. Input variables include variables corresponding to the signals at input terminals 14, while output variables include variables corresponding to the signals at output terminals 16. Other types of input and output variables are described below. A simple ladder logic statement might indicate that a particular output variable is "on" if and only if input variables 1 and 2 are both "on".

For easier comprehension, ladder logic statements and programs are often expressed in terms of ladder logic graphs. A simple ladder logic graph 30 is shown in FIG. 2. The ladder logic graph comprises input symbols 32 and 34, and output symbol 36, interconnected by line segments 40 and 42. Input symbols 32 and 34 are assigned labels or variable names A and B respectively, while variable name C is assigned to output symbol 36. In the convention used in ladder logic graphs, the graph of FIG. 2 is equivalent to the statement that output C is "on" if and only if inputs A and B are both "on", i.e., the equivalent of a logical AND operation between inputs A and B to produce output C. The fact that inputs A and B are ANDed together is indicated by the fact that their input symbols are connected in series by line segment 40. Line segment 42 indicates that the result of A AND B controls output C. Input symbols A and B can be regarded as normally open (i.e., off) switches, and the ladder logic graph can be interpreted by noting that a voltage or other signal present on line segment 44 to the left of the input symbols will reach output point C if and only if switches A and B are both closed (i.e., on).

FIG. 3 represents a second ladder logic graph with inputs A, B, and output C, except that now inputs A and B are connected in parallel by line segments 50 and 52. This ladder logic graph is equivalent to the statement that output C will be on if either input A or input B is on. Thus, the parallel connection provided by line segments 50 and 52 indicates the logical operation OR. As with FIG. 2, the graph of FIG. 3 can be interpreted by noting that a signal present on line segment 50 will reach output C if either switch A or switch B is closed.

In general, two prior methods have been used to permit a user to create ladder logic programs for PLCs. In a first method, the PLC includes an input module that includes a small keyboard. The keyboard typically includes numeric keys, function keys, and a small number of other keys representing different types of variables. The program is entered directly into memory 22 via such a keyboard. For example, to enter the ladder logic statement corresponding to FIG. 3, a user might enter an identifier for input variable A, then press a function key specifying a logical OR operation, then enter a symbol for input variable B, and finally a symbol for output variable C.

A second prior technique for programming PLCs involves creating the ladder logic program on a separate device, such a personal computer, and then transferring the program to memory 22 via a serial data link or the like. In such systems, the operator of personal computer draws a ladder logic graph directly on the computer display screen, one graphical element at a time. When a given ladder logic graph is completed, the PC software converts the graph into the corresponding ladder logic command. The ladder logic commands are then transferred to the PLC and stored in memory 22.

SUMMARY OF THE INVENTION

The present invention provides a system for creating a program for a programmable logic controller (PLC). Using the invention, a user inputs a ladder logic command in an alphanumeric format, and the system then creates a corresponding ladder logic graph on a suitable display means. The user can then verify the relationship between input and output variables depicted in the graph, and if necessary edit the alphanumeric command until the graph depicts the desired relationship. Thus both program entry and program verification take place in the most convenient respective formats, i.e., alphanumeric for program entry and graphical for program verification.

In a preferred embodiment, the system creates a program comprising one or more alphanumeric ladder logic commands. Each command includes an output variable, and logic specifications indicating the manner in which the output variable is to be determined. The system comprises means for accepting user input data specifying one or more ladder logic commands in an alphanumeric format, and means for converting one or more selected ladder logic commands into a corresponding ladder logic graph. The ladder logic graphs are displayed, and permit verification of the ladder logic commands. The display is preferably via a computer display screen, although other display means, such as printers, may also be used.

Each ladder logic graph includes an output symbol corresponding to the output variable, and one or more connection symbols that graphically indicate the logic specifications of the selected command. Typically, each ladder logic command also includes one or more input variables, and each ladder logic graph includes an input symbol corresponding to each input variable. In a preferred embodiment, the connection symbols include line-like elements that connect a pair of input symbols in series to indicate a logical AND operation, and that connect a pair of input symbols in parallel to indicate a logical OR operation.

DETAILED DESCRIPTION OF THE PREFERRED EMBODIMENT

Figure 1:
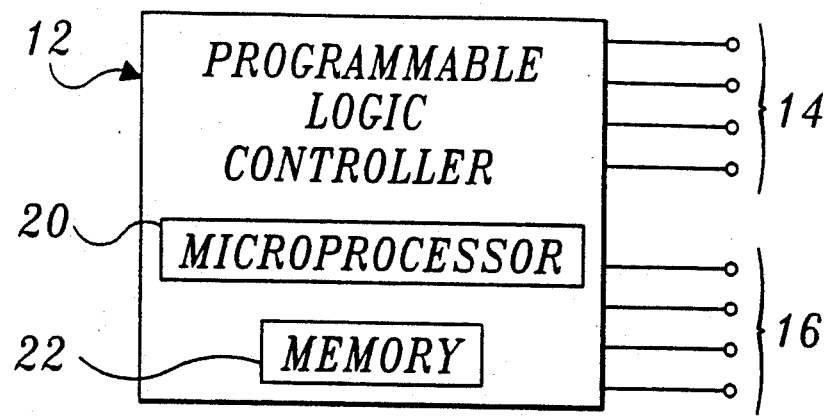
FIG. 1 is a simplified diagram of a programmable logic controller.
Figure 2:
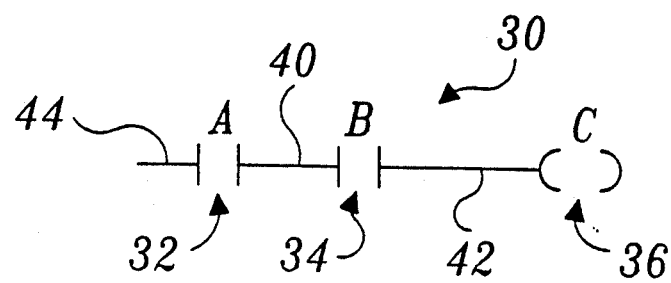
FIGS. 2 and 3 show examples of ladder logic graphs.
Figure 3:
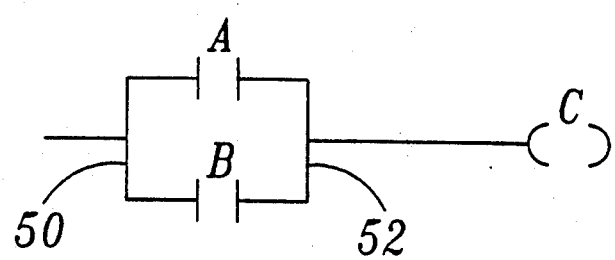
Figure 4:
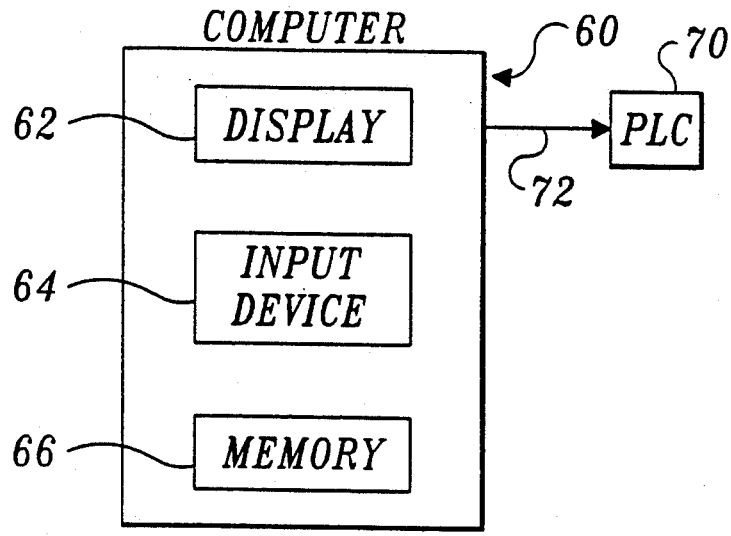
FIG. 4 is a block diagram illustrating the use of a separate computer to produce the PLC program.
Figure 5:
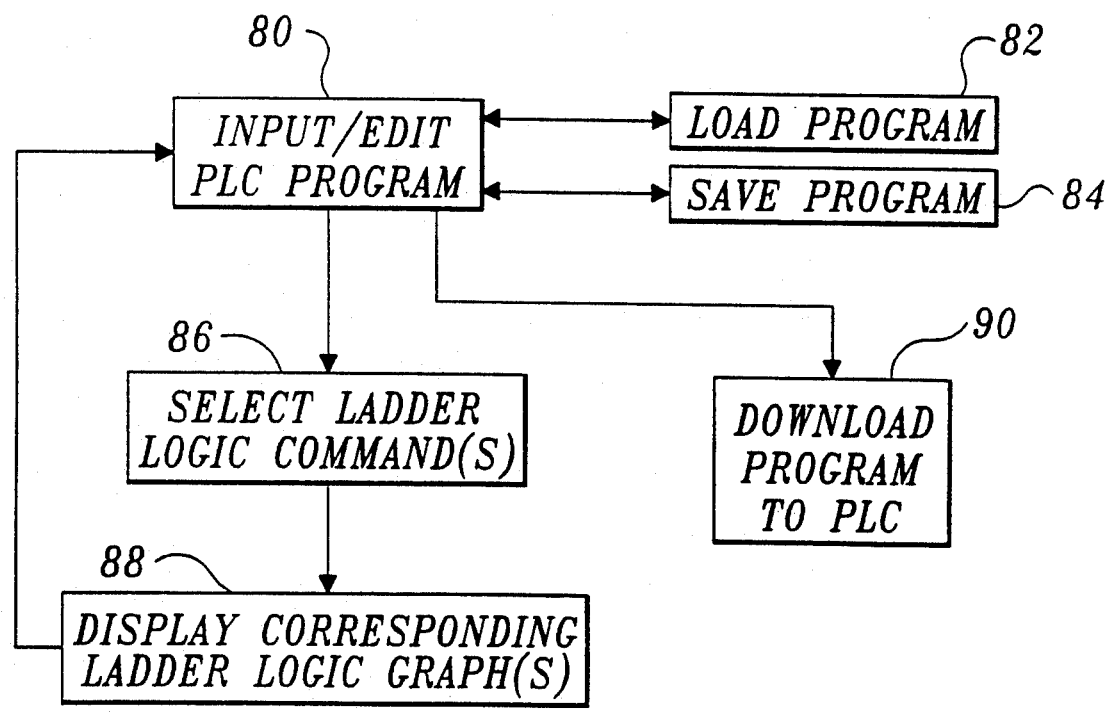
FIG. 5 is a block diagram of a preferred embodiment of the programming system of the invention.

The programming system of the present invention is outlined in FIGS. 4 and 5. Referring initially to FIG. 4, the PLC program is initially created on computer 60 that includes display (e.g., CRT monitor) 62, input system (e.g., keyboard) 64, and memory 66. An operator uses computer 60 to create a suitable PLC program, optionally stores the program in memory 66, and then downloads the program to PLC 70 via link 72 that may comprise a standard RS-232 serial line.

FIG. 5 outlines a preferred embodiment of a program for controlling computer 60 in accordance with the present invention. The program comprises input/edit module 80 that may essentially comprise a text editor or the like. The input/edit module permits a user to input a new PLC program, or to edit a preexisting PLC program, in an alphanumeric format. A preexisting program to be edited may be loaded from memory 66 via load function 82, and a new or edited program may be saved in memory 66 by save function 84.

During the input or editing process, the user may select one (or more) of the ladder logic commands via select function 86. When a given ladder logic command is selected, display function 88 determines and displays the corresponding ladder logic graph on display 62. This display function is described in detail below. Display function 88 essentially allows the user to visualize each ladder logic command, so that the program input and editing process becomes more intuitive and reliable. Exiting from display function 88 returns the user to input/edit module 80, from which point the user may save the PLC program, select other ladder logic commands, or download the PLC program to PLC 70 via download function 90.

In order to provide a clear understanding of the operation of the present invention, a preferred embodiment of display function 88 will now be described, in connection with a specific PLC program. The PLC program used for an example will be a program for controlling the operation of a conventional microwave oven. The statements comprising the program are as follows:

```
 1  @Start=1
 2  @Door=2
 3  @SwTime=3
 4  @SwTemp=4
 5  @TimeZero=5
 6  @AtTemp=0
 7  @MicroWaves=7
 8  @Warming=119
 9  @TimerRunning=118
10  <SwTemp. AtTemp>Warming
11  <SwTime. TimeZero>Timer Running
12  <TimerRunning,Warming.Door.Start>MicroWaves L
13  <   Warming. TimerRunning, Door>MicroWaves R
```

The numbers in the left hand column above are line reference numbers inserted for the purpose of the present description, and do not form part of the PLC program itself.

In a typical PLC, each IO point is identified by a unique number, and such numbers could be used in the program created by computer 60. However, to make the PLC programs more readily comprehensible, a preferred embodiment of the present invention provides a method for associating an alphanumeric label with each IO point number. In the example set forth above, lines 1-9 are examples of labeling commands that provide such labels, all labeling commands beginning with the symbol "@". Thus for example in line 1 above, the alphanumeric label "Start" is associated with IO point 1.

The symbol "<" indicates a ladder logic command. Thus in the program listed above, lines 10-13 are the ladder logic commands. Within each ladder logic command, a period represents a logical AND operation, a comma represents a logical OR operation, a backslash represents a logical NOT operation, and the ">" symbol indicates that the following symbol is the output of that command. Thus, for example, line 10 states that when input variable SwTemp is true AND input variable AtTemp is not true, then output variable Warming is true.

It will be assumed that the input and output variables shown in the above-listed program have the following meanings:

| | |
|---|---|
| Start | This input has the value true when an operator presses the start switch of the microwave oven, and has the value false whenever the start switch is not being pressed. |
| Door | This input has the value true when the door of the microwave oven is closed, and has the value false when the door is open |
| SwTime | This input has the value true when the microwave oven is in timer mode, and the value false when the oven is in temperature mode. Timer mode implies that the oven will be on for a specified length of time, while temperature mode |

| | |
|---|---|
| | indicates that the oven will remain on until a predetermined temperature is reached |
| SwTemp | This input is true in temperature mode, false in timer mode |
| TimeZero | This input has the value true when the mechanical timer has counted down to zero, and otherwise has the value false |
| AtTemp | This input has the value true when the temperature has reached a preselected level, and otherwise has the value false |
| MicroWaves | The oven is on when this output is true, and off when this output is false |
| Warming | As described below, this internal variable represents an "internal relay" that is not associated with any IO point. Its significance is further described below |
| TimerRunning | This internal variable represents a second internal relay |

In the present system, the fact that the Warming and Timer Running are internal variables is indicated by the numbers of the IO points (119 and 118) associated with these variables. An internal variable can be both an input variable and an output variable. For example, in line 10, internal variable Warming is an output variable, while in lines 12 and 13, internal variable Warming is an input variable.

Line 10 of the PLC program set forth above states that when input SwTemp is true AND input AtTemp is false, then internal variable Warming is true. When this ladder logic command is selected in block 86 of FIG. 5, display function 88 determines and produces the ladder logic graph shown in FIG. 6a, in which the ladder logic command has been translated into an equivalent ladder logic graph. The ladder logic graph comprises input symbols 102 and 104, output symbol 106, and line segments 108, 110, and 112. Each input symbol comprises a pair of spaced vertical bars, the name of the corresponding input variable above the bars, and the horizontal lines to either side of the vertical bars. Output symbol 106 is similar, except that it includes parentheses rather than vertical bars. Input symbol 104 includes a backslash that reflects the logical NOT symbol appearing with this in front of the AtTemp variable in program line 10. Line segment 108 simply indicates the beginning of the ladder logic graph, line segment 110 indicates a logical AND operation corresponding to the period in program line 10, and line segment 112 connects the input symbols and their associated logic with output symbol 106.

Figure 6A:
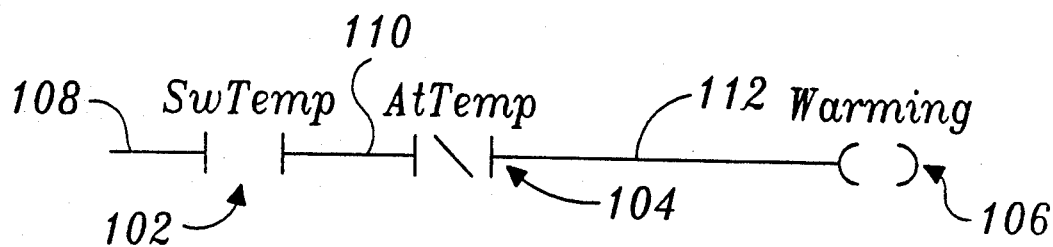
FIGS. 6a-6d illustrate ladder logic graphs corresponding to a particular PLC program.

For many if not most PLC programmers, the graphical display shown in FIG. 6a can be more readily comprehended than the textual command shown in program line 10 above. However, the programming system of the present invention does not require the user to painstakingly create a ladder logic graph on the computer screen. Instead, the invention requires the user to perform the far simpler task of typing in an alphanumeric command, and the corresponding ladder logic graph may then be created automatically.

Figure 6B:
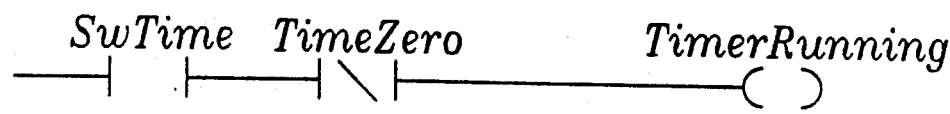
Figure 6C:
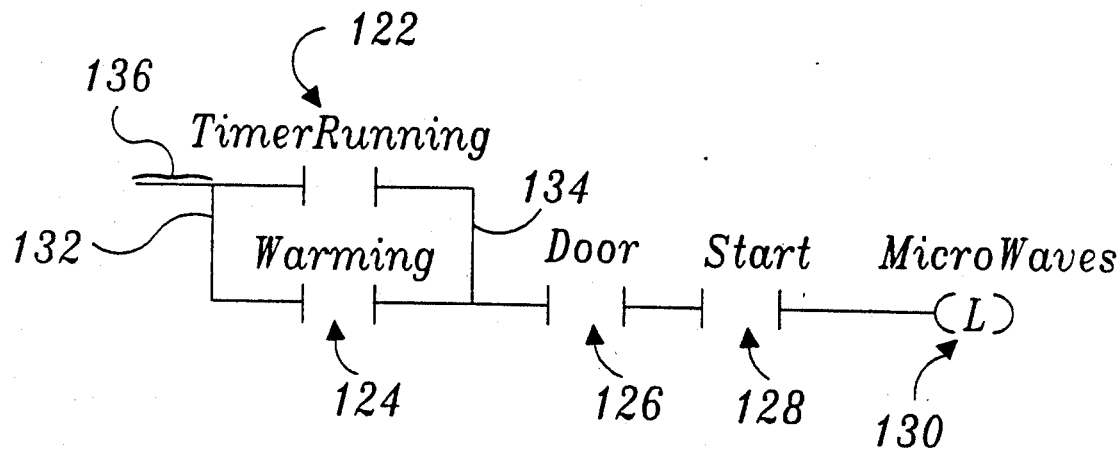
Figure 6D:
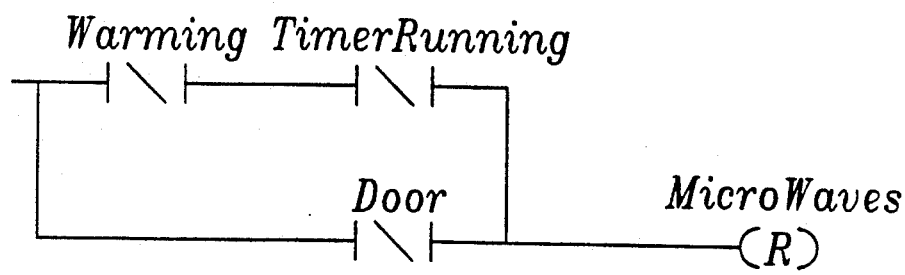

In a similar manner, FIGS. 6b, 6c, and 6d illustrate the ladder logic graphs created by display function 88 for PLC program lines 11-13, respectively. FIG. 6b illustrates the setting of the internal variable TimerRunning. FIG. 6c shows how the microwave oven is turned on, while FIG. 6d shows how the microwave oven is turned off. Examining FIG. 6c in detail, this ladder logic graph includes input symbols 122, 124, 126, and 128, and output symbol 130. Input symbols 122 and 124 correspond to the internal variables TimerRunning and Warming, respectively. These input symbols are connected in parallel by line segments 132 and 134, respectively, indicating a logical OR operation. Line segment 132 includes segment 136 that indicates the beginning of a ladder logic graph. The symbol "L" in output symbol 130 reflects the latch indicator "L" appearing at the end of program line 12. The latch indicator specifies that the Microwaves output will be latched into the true state by the PLC whenever the conditions shown in FIG. 6c are satisfied. Thus an operator of the microwave oven is only required to momentarily depress the Start switch in order to turn the oven on. In a preferred embodiment of the invention, each output variable can have one of four modes. These modes are normal (N), one-shot (O), toggle (T), and latch (L). The N mode is the default, and causes the output variable to be on when its input is on, and off when its input is off. Latch mode causes the output variable to remain on even after its input is off. For an output variable that has been latched, the variable is turned off using the R symbol. Finally, one-shot mode indicates that when its input is on, the output variable remains on for one complete scan, and then is turned off.

As indicated in FIG. 6d, the microwave output will be reset (R) whenever the door is open, or whenever the oven reaches the preset temperature in temperature mode or the end of a preset interval in timer mode. Comparing program lines 10-13 with FIGS. 6a-6d readily indicates the improvement in program writing and debugging that is made possible by the present invention.

Figure 7:
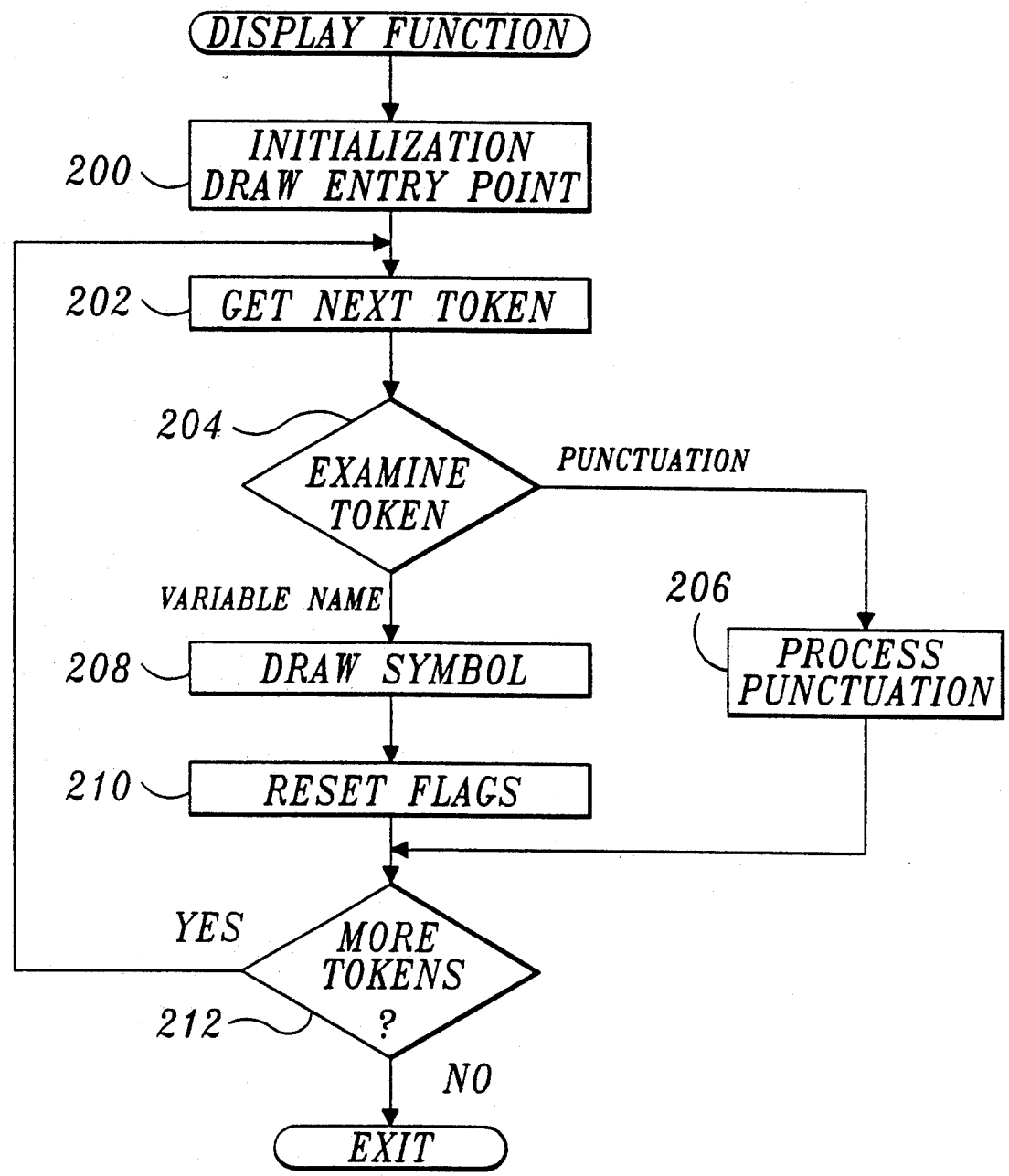
FIG. 7 is a flow chart showing the overall operation of a preferred embodiment of the invention.
Figure 8:
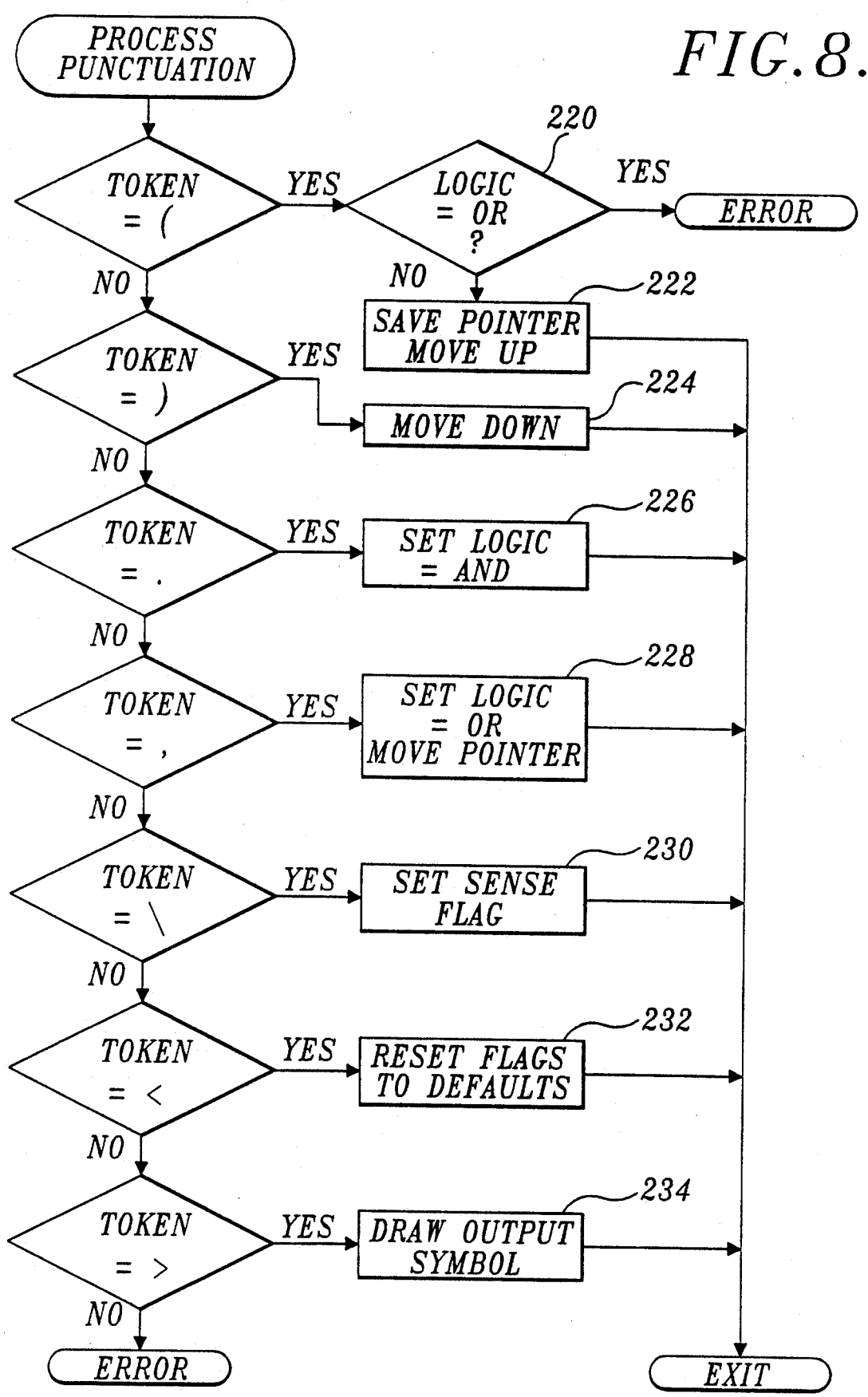
FIG. 8 is a flow chart of the punctuation processing module.

FIGS. 7 and 8 set forth a flow chart for a preferred embodiment of the display function. The operation of these flow charts will be illustrated by program line 12 above, and the corresponding ladder logic graph shown in FIG. 6c. The display function of FIG. 7 begins with an initialization step in block 200. Preferably, the display area on which the ladder logic graph will be drawn is divided into a two-dimensional array of grid elements, with each grid element being large enough to display an input or output symbol. On a conventional 80×25 computer monitor, a suitable size for each grid element is eight characters wide and two characters high.

Block 200 initializes a current grid pointer, preferably to a grid element at the left center of the drawing area. Block 200 then proceeds to draw the entry point for the ladder logic graph, the entry point being shown by reference number 136 in FIG. 6c. Each time that a given graph element is drawn, the grid pointer is updated in a corresponding manner. Thus, in the case of entry point 136, the grid pointer would be incremented to specify that the next portion of the ladder logic graph will be in the middle row, second column, of the grid array.

The program diagrammed in FIG. 7 then proceeds in block 202 to obtain the next token from the alphanumeric ladder logic command. A "token" is a unit of the ladder logic command. Thus for program line 12, the tokens are the variable names TimerRunning, Warming, Door, Start, and Microwaves, and the punctuation symbols <, comma, period, backslash, and >. Block 204 examines the next token, to determine whether it is a variable name or a punctuation symbol. In program line 12, the first token is the punctuation symbol <, so program control flows to block 206 that is further diagrammed in FIG. 8. For the token "<", block 232 will cause all flags to be reset to their default values, since this token corresponds to the beginning of a program line. Control will then return to block 212 in FIG. 7, and from there back to block 202 to retrieve the next token.

The next token is the variable name TimerRunning, so that block 204 passes control to block 208, which draws the corresponding input symbol 122 shown in FIG. 6c. Block 210 then resets all flags, and control again returns to block 202 to retrieve the next token. Since the next token is a ",", the result will be that block 288 (FIG. 8) will set the logic flag equal to OR. The succeeding token, the variable name Warming, will cause control to be passed to block 208. Since the OR flag is set, block 208 moves the grid pointer down one row, and then draws input symbol 124. The next token "." resets the logic flag to AND in block 226, so that the next token "Door" causes block 208 to be entered with the logic flag equal to AND. As a result, input symbol 126 and line segment 134 are drawn to the right of the prior symbol 124, without changing rows. A similar process occurs for input symbol 128. The token ">" then results in the drawing of output symbol 130 and the line interconnecting this output symbol with input symbol 128 at which point the display function is complete.

FIG. 8 also illustrates the way in which the display function uses parentheses, which may be used in the ladder logic commands to group operations. As indicated by blocks 220, 222, and 224, the "(" token causes the current grid pointer to move up by one row, assuming that the OR logic flag has not been set. The token ")" causes the grid pointer to move back down one row. FIG. 8 also illustrates that in block 230, the backslash token causes a sense flag to be set, which flag is used by draw symbol block 208 to place a backslash in the input symbol.

In a preferred embodiment, the present invention provides for the use of parentheses to specify the order in which logical operations are to be carried out. For example, a ladder logic statement of the following form <a.b,c>d would normally be evaluated by ANDing variables a and b, and then ORing the result with variable c to produce variable d. However, the sequence of operations can be modified using parentheses as follows <a.(b,c)>d.

In this case, variables b and c are ORed, and the result is then ANDed with variable a to produce variable d.

Figure 9:
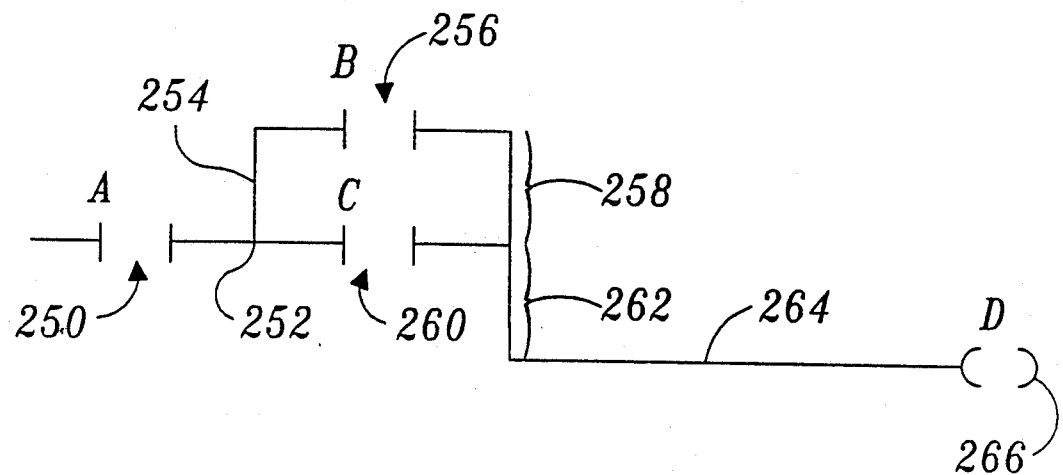
FIG. 9 illustrates a ladder logic graph derived from a ladder logic command using parentheses.

In a preferred embodiment of the present invention, this above statement (with parenthesis) would produce the ladder logic graph shown in FIG. 9. Referring to the flow chart of FIGS. 7 and 8, the entry point symbol would be drawn in block 200, and input symbol 250 is then drawn in block 208. In this graph, the entry point symbol merges with the horizontal line at the left of the input symbol. The following token is a period, and block 226 therefore sets the logic flag equal to AND. The next token is a left parentheses, so the control is then passed to block 220 that tests the logic flag. Since the logic flag is not equal to OR, block 222 causes the current grid pointer position 252 to be saved, and then moves the grid pointer up one grid element, drawing line 254. The next token, the variable name B, results in the drawing of input symbol 256. The next token is a comma, and block 228 therefore sets the logic flag equal to OR, draws line segment 258, and moves the current grid pointer back to point 252. The next token is the input name C, and input symbol 260 is then drawn, after which the program encounters the right parentheses token. This causes the grid pointer to move down in block 224, drawing line segment 262. The process then continues as previously described with the production of line 264 and output symbol 266.

Most PLCs include means for emulating commonly used electronic hardware elements such as counters and timers. Each timer or counter has an associated variable that controls its operation. Such variables will herein be referred to as timer IO points and counter IO points, respectively. A timer counts up or down from a preset value for as long as its associated timer IO point is on. Counters, on the other hand, will count one count whenever the associated counter IO point makes a transition from off to on. The output of a timer or counter can be in normal, one-shot, toggle or latch mode, as with a conventional output variable.

In a preferred embodiment, the programming system of the present invention uses a two-step process to create a ladder logic graph that includes a counter or timer. For example, the following two statements added to a PLC program >tm0 10.50 2 T A <A.B>tm0 would produce the ladder logic graph shown in FIG. 10. The first statement set forth above, beginning with a right hand angle bracket, is a definition of a particular timer, here labeled tm0. The four parameters following the timer name provide the preset value (the value set into the timer or counter when the timer is reset), the name of the output variable (C) controlled by the timer and the output mode (N,O,T or L). The fourth parameter "A" is an optional parameter. When included, it will cause the timer or counter to be automatically reset when the count hits zero.

Figure 10:
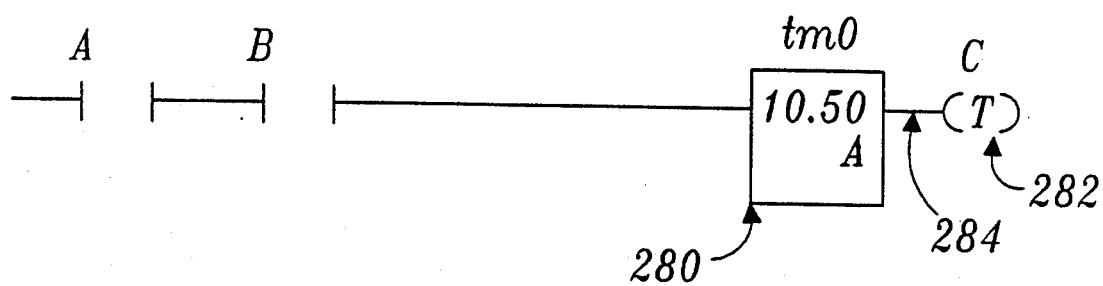
FIG. 10 is a ladder logic graph that includes a timer symbol.

FIG. 10 illustrates the ladder logic graph corresponding to the second program statement set forth above. As shown, the timer symbol tm0 produces the display of a timer symbol 280 that includes a rectangle with the timer label tm0 above the rectangle, the preset and auto parameters within the rectangle, and the output variable C to the right of the timer symbol connected to it by line segment 282. A similar display would be created for a counter.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A system for generating a display useful for creating a program for a programmable logic controller (PLC), the program comprising one or more alphanumeric ladder logic commands, the PLC being adapted to execute said ladder logic commands, each ladder logic command comprising an output variable and logic specifications indicating the manner in which the output variable is to be determined, the system comprising:

means for accepting user input data specifying one or more ladder logic commands in an alphanumeric format; and means for converting one or more selected ladder logic commands in alphanumeric format into a corresponding ladder logic graph and for displaying said ladder logic graph, the ladder logic graph including an output symbol corresponding to the output variable, and one or more connection symbols that graphically indicate the logic specifications of the selected ladder logic command.

2. The system of claim 1, wherein each ladder logic command comprises one or more input variables, and wherein the ladder logic graph includes an input symbol corresponding to each input variable.

3. The system of claim 2, wherein each connection symbol comprises one or more line-like elements interconnecting the input and output symbols.

4. The system of claim 3, wherein the logic specifications include an AND specifier specifying a logical AND operation, an OR specifier specifying a logical OR condition, and wherein the line-like elements connect a pair of input symbols in parallel to signify a logical OR operation, and interconnect a pair of input symbols in series to signify a logical AND operation.

5. The system of claim 1, wherein each input and output symbol includes an identifier for the symbol in an alphanumeric format.

6. The system of claim 1, wherein the ladder logic graph comprises a two-dimensional array of grid elements, and wherein each input and each output symbol occupies one grid element.

7. A method of generating a display useful for creating a program for a programmable logic controller (PLC), the program comprising one or more alphanumeric ladder logic commands, the PLC being adapted to execute said ladder logic commands, each ladder logic command comprising an output variable and logic specifications indicating the manner in which the output variable is to be determined, the method comprising the steps of:

accepting user input data specifying one or more ladder logic commands in an alphanumeric format; and converting the one or more specified ladder logic commands in alphanumeric format into a corresponding ladder logic graph, the ladder logic graph including an output symbol corresponding to the output variable and one or more connection symbols that graphically indicate the logic specifications of the selected ladder logic format; and displaying said ladder logic graph.

8. The method of claim 7, wherein each ladder logic command comprises one or more input variables, and wherein the ladder logic graph includes an input symbol corresponding to each input variable.

9. The method of claim 8, wherein each connection symbol comprises one or more line-like elements interconnecting the input and output symbols.

10. The method of claim 9, wherein the logic specifications include an AND specifier specifying a logical AND operation, an OR specifier specifying a logical OR condition, and wherein the line-like elements connect a pair of input symbols in parallel to signify a logical OR operation, and interconnect a pair of input symbols in series to signify a logical AND operation.

11. The method of claim 7, wherein each input and output symbol includes an identifier for the symbol in an alphanumeric format.

12. The method of claim 7, wherein the ladder logic graph comprises a two-dimensional array of grid elements, and wherein each input and each output symbol occupies one grid element.

* * * * *